(12) United States Patent
Potts

(10) Patent No.: US 7,272,536 B2
(45) Date of Patent: Sep. 18, 2007

(54) FAILURE WARNING FOR A TIRE AMONG A PLURALITY OF TIRES

(76) Inventor: Gerald R. Potts, 3422 Bancroft Rd., Akron, OH (US) 44333

(*) Notice: Subject to any disclaimer, the term of this patent is extended or adjusted under 35 U.S.C. 154(b) by 0 days.

(21) Appl. No.: 11/420,002

(22) Filed: May 23, 2006

(65) Prior Publication Data

US 2006/0265154 A1 Nov. 23, 2006

Related U.S. Application Data

(60) Provisional application No. 60/683,611, filed on May 23, 2005.

(51) Int. Cl.
*G06F 15/00* (2006.01)

(52) U.S. Cl. .......................... 702/185; 701/29

(58) Field of Classification Search ........ 702/182–185, 702/188; 701/31–32, 35, 99, 102, 46, 117, 701/29, 101

See application file for complete search history.

(56) References Cited

U.S. PATENT DOCUMENTS

2005/0066730 A1* 3/2005 Raichle ....................... 73/579

* cited by examiner

*Primary Examiner*—Edward Raymond
(74) *Attorney, Agent, or Firm*—Dwight A. Stauffer

(57) ABSTRACT

Method and system for determining immanence of catastrophic failure for a selected tire among a plurality of tires that are concurrently in operation, the method comprising the steps of: selecting a tire from the plurality of tires; monitoring vibration amplitude versus time signals for the selected tire; using signal averaging to minimize signal noise in the selected tire's vibration signals; at selected intervals, fast Fourier transforming the averaged vibration signals to create a harmonic spectrum for the selected tire; cleaning the selected tire's harmonic spectrum by applying coherence function and averaging calculations to it for minimizing contributions to the selected tire's harmonic spectrum from all other vibration sources including the remaining one(s) of the plurality of tires; comparing the most recent cleaned spectrum with stored values of previous cleaned spectra of the selected tire to track changes in higher order harmonic magnitudes; and determining whether catastrophic failure of the selected tire is immanent by analyzing the changes in higher order harmonic magnitudes and comparing them with predetermined failure criteria.

18 Claims, 2 Drawing Sheets

FAILURE WARNING FOR A TIRE AMONG A PLURALITY OF TIRES

CROSS-REFERENCE TO RELATED APPLICATIONS

This application claims the benefit of U.S. Provisional Patent Application No. 60/683,611, filed May 23, 2005 by Gerald R. Potts, the entirety of which is incorporated by reference herein.

TECHNICAL FIELD OF THE INVENTION

The present invention relates to tire vibration monitoring and, more particularly, to method and apparatus for measuring vibration of multiple simultaneously rotating tires and for analysis of the measurement data to determine which of the tires is about to fail catastrophically.

BACKGROUND OF THE INVENTION

A common test of pneumatic tires is to run a test tire under controlled test conditions including (rotational) speed, loading (force between the tire and the running surface), tire fill pressure, and ambient conditions. Typically the state of the tire is measured both continuously while running, and periodically when stopped for various static tests such as x-rays, visual checks, temperature profile, and the like. The continuous measurements include tire pressure, average temperature, and importantly, tire vibration as detected by one or more vibration sensors (typically force transducers and/or accelerometers).

Tire vibration measurements are typically performed on production tires as a quality check of the "tire uniformity". A tire with excellent uniformity will produce very low vibration amplitudes when rotated at high speed with or without a load. In contrast, an out of balance tire will produce an abnormally high first harmonic amplitude, i.e., a peak that repeats once per rotation of the tire. This can also be described as producing a vibration signal that is periodic with a frequency equal to the rotational speed of the tire. The vibration signal is a plot of vibration amplitude versus running time of the tire. The term "vibration" is used herein as a generic term for displacement, force, or acceleration, depending upon which characteristic is being sensed and/or calculated from the "vibration" sensor output data. In other words, the "vibration signal" is essentially a plot of sensor output versus time, where the sensor is typically either a force transducer or an accelerometer that is suitably mounted on the tire testing machine.

A vibration signal (vibration amplitudes plotted in the time domain) can be converted to a frequency domain plot (spectrum) through the use of Fourier transforms, particularly the quick approximation resulting from a computer algorithm known as a fast Fourier transform (FFT). The FFT spectrum shows the relative amount of vibration at each frequency from a low limit to a high frequency limit, where the limits are determined by sensor capability and by knowledge of the range of frequencies that produce useful information. For example, a typical automobile tire on a vehicle traveling at 100 miles per hour (161 kilometers per hour) will rotate about 25 times per second, i.e., 25 Hz (Hertz, cycles per second). In this example, the first harmonic is therefore 25 Hz; the second harmonic is two times that or 50 Hz; the third harmonic is three times that or 75 Hz; and so on. Thus an FFT spectrum (harmonic spectrum) calculated out to 500 Hz is sufficient to show vibration magnitudes out to the $20^{th}$ harmonic for this example. Since tire test equipment generally uses a rotational angle detector (encoder), the rotational speed (angular velocity) of the tire is always known, and therefore the harmonic spectrum's frequency axis can be normalized to a harmonic scale (integer values of the harmonics).

Analysis of the harmonic spectrum for a tire test can indicate many different tire conditions. For example, as stated above, the first harmonic magnitude increases with the amount of tire imbalance. In another example, since a tire "footprint" is generally about one sixth of a tire's circumference, a "flat spot" the size of the footprint will produce an unusually high magnitude sixth harmonic when the tire is running under load. It has long been known that magnitudes of typically the first five harmonics and sometimes even the sixth or seventh harmonics, are more indicative of gross effects that are humanly discernable as characteristics of the "ride". Gross effects are typically tire non-uniformities that occur over a relatively large area of the tire, such as mass non-uniformities that cause static or dynamic imbalance, and such as tire shape non-uniformities like out-of-roundness, conicity, tread squirm, uneven tread wear, etc.

In 1985, the inventor reported on "Fourier Transform Applications to Tire Life Testing" (published: Tire Science and Technology; Vol. 15, No. 3, July-September, 1987, pp. 173-187). For the purpose of tire life testing, the "end of life" for a tire (not counting tread wear) is when the tire undergoes catastrophic failure such as a blow-out or a major separation of tire components (often loss of tread pieces). In his paper, the inventor reported observing that higher harmonics undergo significant magnitude changes (both increases and decreases) before and during catastrophic failure of the tire. Furthermore, higher harmonic magnitude changes occur quite rapidly near to the time of tire failure. He noted that this makes sense since higher harmonics are important for detecting very localized changes in tire structure. The term "higher harmonics" generally means harmonic 6 and above. Thus monitoring magnitudes of the higher harmonics during a tire test is useful for detecting warning indications of immanent catastrophic failure. Given a warning, the life test can be immediately halted so that the tire can be analyzed in detail for determination of the cause of failure. If the tire had been allowed to fail catastrophically, then such detailed analysis would be much more difficult and would yield far less detailed results.

In the case of vehicles riding on pneumatic tires (e.g., automobiles, motorcycles and trucks) catastrophic failure is at the very least upsetting and inconvenient, and can even be the cause of lethal accidents. Therefore immanent failure warning for vehicular tires is very desirable. Compared to tire testing machines, vehicles present a number of significant challenges to the simple application of the harmonic spectrum monitoring method presented above. One of the major challenges is that a vehicle always has a plurality of tires (at least two) that are concurrently operating at roughly the same rotational speed determined by the vehicle speed and the fact that all the tires are usually the same diameter. Since all the tires are connected quite solidly to the same vehicle frame, the vibrations measured by a sensor at one tire will necessarily include vibration generated by all of the other tires connected to the same frame. Another challenge is the extraneous vibrations ("noise") generated by drive shafts, bearings, CV joints, U joints, differentials, the engine, and the like, all of which generate cyclic (periodic) vibration signals which will be picked up by the vibration sensors mounted at the wheels. Finally, there will also be non-cyclic (random) vibrations such as wind noise and especially road noise (due to the road surface upon which the tires are running).

There are numerous publications in the prior art that disclose various techniques for eliminating machine noise or machine contributions to the tire vibration signal measured on tire test machines. For example, U.S. Pat. No. 6,655,202 (Potts et al.; 2003) discloses the use of a plurality of accelerometers that allow the forces and the moments of the components of the measurement station to be calculated and accounted for in the overall force measurement. For example, U.S. Pat. No. 6,705,156 (Shteinhauz et al.; 2004) discloses a cross-correlation method for identification and removal of machine contribution from tire uniformity measurements. Cross correlation is a well known mathematical technique for comparing multiple periodic signals to determine a time/angle shift that will optimally synchronize one signal with another so that the multiple signals can be combined and averaged to eliminate (average out) noise components in the signals.

It is an object of the present invention to advance the state of the art such that immanent tire failure warning techniques developed on individual tire test machines can be applied to situations wherein a plurality of tires are concurrently operating and interacting with each other through a common structure. A primary objective is to develop such a warning system and method for automotive vehicles, but other applications are also anticipated, as will be described hereinbelow.

BRIEF SUMMARY OF THE INVENTION

A method and system for determining immanence of catastrophic failure for a selected tire among a plurality of tires that are concurrently in operation, is a method comprising the steps of: selecting a tire from the plurality of tires; monitoring vibration amplitude versus time signals for the selected tire; using signal averaging to minimize signal noise in the selected tire's vibration signals; at selected intervals, fast Fourier transforming the averaged vibration signals to create a harmonic spectrum for the selected tire; cleaning the selected tire's harmonic spectrum by applying coherence function and averaging calculations to it for minimizing contributions to the selected tire's harmonic spectrum from all other vibration sources including the remaining one(s) of the plurality of tires; comparing the most recent cleaned spectrum with stored values of previous cleaned spectra of the selected tire to track changes in higher order harmonic magnitudes; and determining whether catastrophic failure of the selected tire is immanent by analyzing the changes in higher order harmonic magnitudes and comparing them with predetermined failure criteria.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199a, 199b, 199c, etc. Or, related but modified elements may have the same number but are distinguished by primes. For example, 109, 109', and 109" are three different elements which are similar or related in some way, but have significant modifications. Such relationships, if any, between similar elements in the same or different figures will become apparent throughout the specification, including, if applicable, in the claims and abstract.

Figure 1:
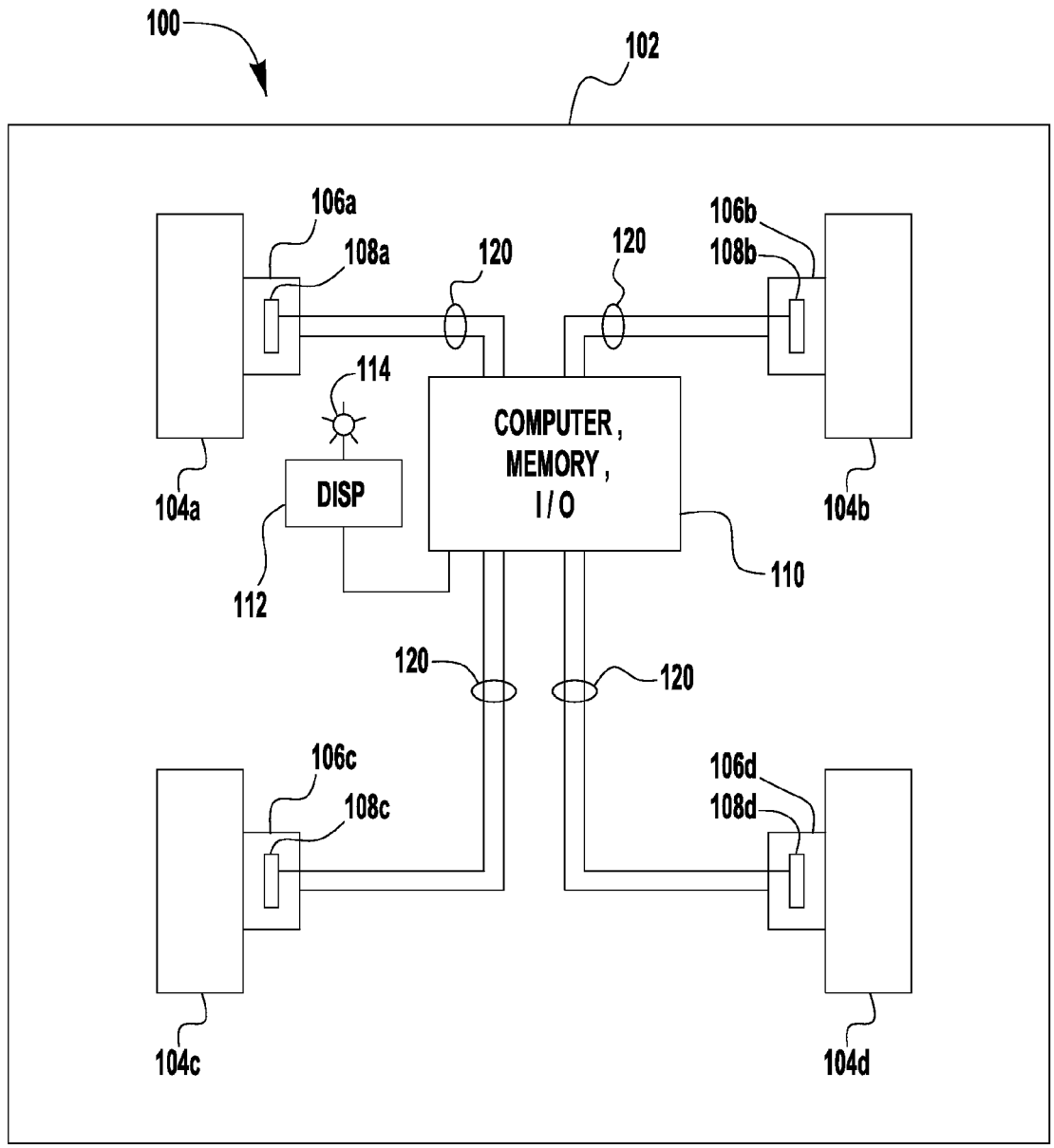
Figure 2:
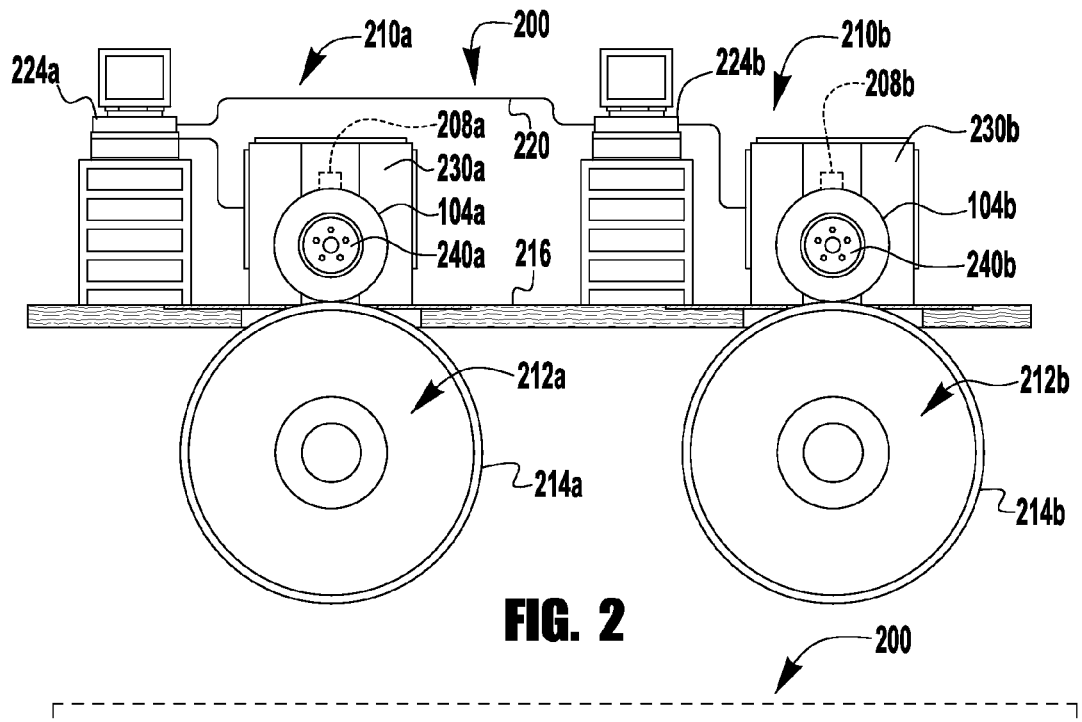
Figure 3:
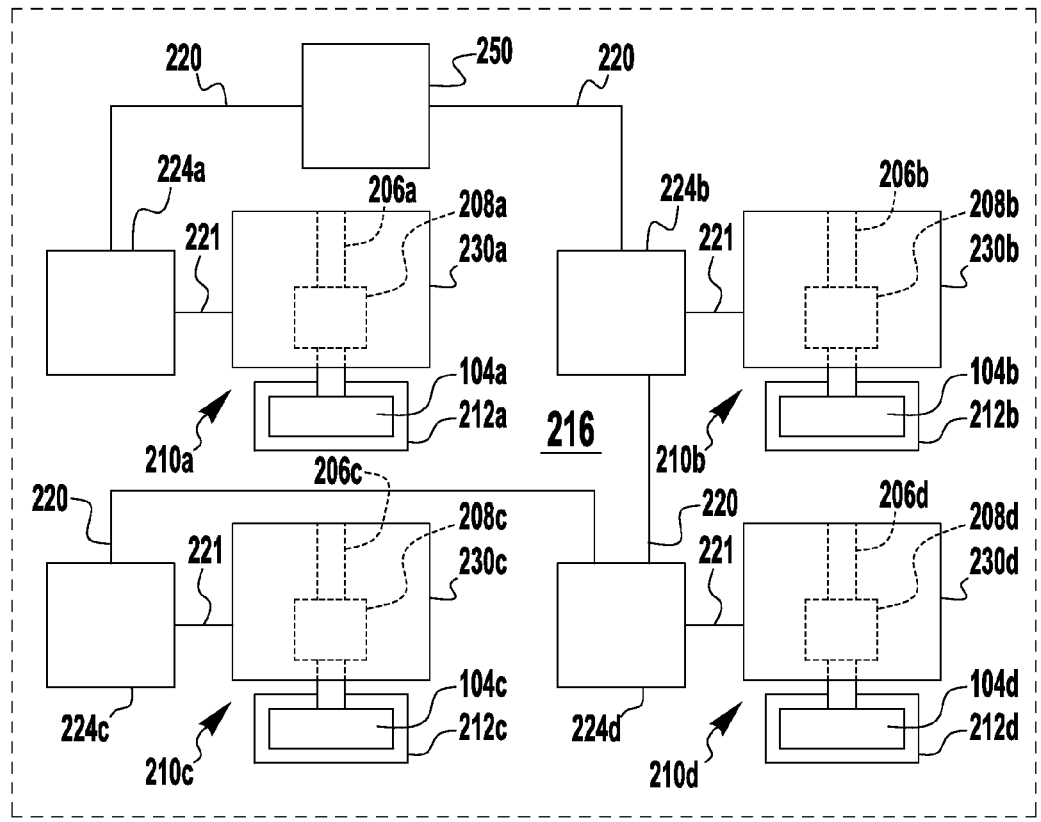

The structure, operation, and advantages of the present preferred embodiment of the invention will become further apparent upon consideration of the following description taken in conjunction with the accompanying drawings, wherein:

FIG. 1 is a schematic illustration of a vehicle with a failure warning system implemented therein, all according to a first embodiment of the invention;

FIG. 2 is a side view of two concurrently operating tire testing machines which are installed on a common support structure (a floor shown in cross-section), the two machines being part of a tire testing system according to a second embodiment of the invention; and FIG. 3 is a top plan view of the tire testing system of FIG. 2, all according to the invention.

DETAILED DESCRIPTION OF THE INVENTION

The preferred embodiment of the present invention is a tire failure prediction and warning system for a vehicle having a plurality of tires upon which the vehicle rides, therefore the invention is first described with reference to a common example of such—an automotive passenger vehicle, i.e., a car. This embodiment is not intended to be limiting. It should be apparent that the disclosed inventive aspects will equally well apply to other vehicles, either automotive (self powered, e.g., by an internal combustion engine) or not. For example, other vehicular embodiments considered within the scope of the present invention are: bicycles and motorcycles (2-wheeled); cars, vans and SUVs (4-wheeled); small to medium size trucks (4 to 6-wheeled); and various tractor/trailer combinations (2 to 18-or-more-wheeled). A second embodiment will also be described wherein the inventive methods are extended to apply to a system wherein a plurality of tires are on a plurality of concurrently operating tire testing machines, all of which are installed on a common support structure (e.g., the floor of a testing laboratory).

Referring first to FIG. 1, a preferred embodiment of the invention 100 is a vehicle 102 that has four tires 104 operatively mounted on a single frame (body, chassis) 102. Operative mounting may include, for example, springs, shocks, bearings, couplings, U-joints, CV joints, differentials, drive shafts, transmissions, motors, etc. There is a front left tire 104a, a front right tire 104b, a rear left tire 104c, and a rear right tire 104d. In other words, the preferred embodiment is a generic automobile or passenger car having one tire per axle or end of axle (e.g., a non-driven rear axle could be continuous from a left end with the left rear tire 104*c* mounted thereupon, to a right end at the other side of the car with the right rear tire 104*d* mounted thereupon). Each tire 104 has a wheel hub and bearing 106 by means of which the tire 104 is rotatingly mounted on the frame 102 and through which motive power may be transmitted from the drive train (not shown) to the tire 104. Just as tire 104 is a collective reference to four tires 104*a*, 104*b*, 104*c*, 104*d* (104*a* to 104*d*); so too is hub and bearing 106 a collective reference to four corresponding hub/bearings 106 from the front left hub/bearing 106*a*, to the right rear hub/bearing 106*d*. Most contemporary cars have 4-wheel anti-lock brakes, which incorporate a tire rotational angle detector (encoder) in each hub/bearing 106. Although optional, a tire revolution indicator of some sort is preferably installed at each hub/bearing 106 for the use of the inventive system 100. An angle encoder is best, but even a simple timing pulse emitted once per tire/hub revolution will suffice as a tire revolution indicator 106 (having the same reference number as the hub/bearing since it is assumed to be incorporated therein, or mounted thereupon).

A vibration sensor 108 (preferably an accelerometer) is mounted as close as possible to each of the (four) operating tires 104, preferably mounted on a non-rotating part of the hub/bearing 106 as close as possible to the tire 104. Less preferably the vibration sensor 108 may be mounted on a rotating part of the wheel/hub/bearing/axle system, or on the axle housing or a portion of the suspension system nearest the tire 104, or even on the car frame or body 102 near to the tire 104 and/or near to an attachment point of the suspension system to the frame 102. Thus four vibration sensors 108*a* to 108*d* are mounted as close as possible to each corresponding one of the four tires 104*a* to 104*d*.

The vibration sensors 108 and the revolution indicators 106 (if present) are connected through signal wires 120 to a central computer 110, which in turn has suitable output(s) to a display 112 and/or a warning indicator 114 (e.g., beeper and/or flashing light), preferably mounted in the vehicle cab, visible and/or audible to the vehicle operator. The computer 110 is a microprocessor with sufficient data storage memory and appropriate input/output interfaces (I/O) as needed to perform all the functions described herein for the inventive system 100.

The computer 110 applies Fourier analysis techniques (fast Fourier transform or FFT) to determine when catastrophic tire failure (e.g., a blow-out or serious tread separation) is likely and/or imminent, and then displays appropriate warnings in the vehicle cab by means of the display 112 and/or the warning indicator(s) 114. Also, early warnings in the form of longer term predictions are optional but preferred. Furthermore, warning indications preferably identify a specific tire 104, and even further preferably a rotational angle for a failure inducing defect in the specific tire 104 and/or a failure or problem type indication (e.g., tread separation, low pressure, non-uniform tread wear, blow-out, etc.). The following inventive method is used to determine immanent tire failure.

As detailed in the background hereinabove, significantly changing and/or rapidly changing magnitudes of higher order harmonics are considered to be an indication of small failures that are building up to a catastrophic failure. Subsequent testing and analysis by the inventor have revealed that the most important harmonics to monitor for changes indicative of catastrophic failure are the sixth and higher harmonics, most particularly the sixth through the fifteenth harmonics inclusive. The inventor has also determined that for some higher order harmonics, immanent catastrophic failure can be indicated by acceleration of magnitude changes, i.e., the second derivative of harmonic magnitude changes over time. Even further, the inventor has determined that comparison of recent harmonic magnitudes with initial harmonic magnitudes can yield indicators of immanent catastrophic failure. In tire testing, "initial" measurements are generally made after a predetermined tire warmup procedure has been implemented. For example, the tire will be run at a predetermined speed or series of speeds for a predetermined amount of time(s) and under a predetermined load. For the purpose of tire monitoring on a vehicle, the warmup procedure should be more flexible, such as, for example, first logging a minimum number of revolutions after installation on the vehicle, then recording the initial harmonic magnitudes when the tire is operating above a specified angular velocity after continuously operating above a specified angular velocity for a specified amount of time.

Thus failure warning indications can be determined by the results of many different types of comparisons and calculations made between harmonic magnitudes of selected harmonics that were determined at different times over the life of the tire. Any comparison result that yields an indication of immanent catastrophic failure can be considered for use as a failure criterion. Laboratory life testing of tires that are representative of a given type of tire is used to empirically determine which comparison or combination of comparisons will provide a useable, practical, and/or reliable failure criterion for the given type of tire. Generally speaking, the comparison will involve higher order harmonic magnitudes, but the same comparison may not work well enough for all types of tires. Furthermore, once a particular comparison is selected as a failure criterion, then a warning limit must be determined wherein immanent catastrophic failure is determined when the result of the particular comparison crosses over the warning limit value. For example, a warning limit may be a predetermined maximum rate of change (time derivative) of any one of the higher order harmonic magnitudes. Then an immanent catastrophic failure warning would be issued for an operating tire when, for example, the tire's tenth harmonic magnitude starts changing at a rate that exceeds the warning limit. If the warning limit is a minimum value, then the limit is crossed when the measured value drops down to a value below the limit.

A warning limit can be desensitized by, for example, testing a rolling average or a logarithmically weighted average against the limit; and/or, for example, requiring the warning limit to be crossed for a minimum quantity of tire revolutions or time.

Alternatively, or in addition, a warning limit may be a predetermined absolute increase of selected higher order harmonic magnitudes relative to their initial magnitudes. Then an immanent catastrophic failure warning would be issued for a tire when the tire's absolute magnitude increase for a selected harmonic crosses the warning limit (in this case, exceeding it).

In order to make a variety of comparisons the computer 110 of the inventive vehicular system 100 must maintain some form of a lifetime FFT history for each tire 104. For example, the history could be a database table of selected higher order harmonic magnitudes sampled and stored in the computer memory 110 over time, possibly with a dynamically determined sampling algorithm (e.g., more frequent samples when magnitudes are changing rapidly). Alternatively, if the predetermined failure criteria do not require comparisons with initial or otherwise "old" harmonic magnitudes, then much less memory will be needed to temporarily store current and recent values that are constantly being replaced by newer values. Storing a lot of historical values can also be avoided by using a rolling or logarithmically weighted average and, if needed, also storing the initial harmonic magnitudes for long term comparisons. Another compromise that saves computer memory 110 is to only save a history of periodic sample values wherein the sampling period could be, for example, one hundredth of the total number of revolutions in a typical lifetime for the subject tire. Thus the saved values may be differences between recent and original FFT harmonic spectra. Depending upon what are the preselected failure criteria, stored data values can be, for example, an initial average harmonic spectrum (limited to selected harmonics), periodic harmonic magnitudes, and/or time derivatives of the harmonic magnitudes.

Although not intended to be a complete or patentably limiting listing, there now follows a list of potentially useful failure criteria:

a) Analyzing only harmonic magnitudes for harmonics greater than or equal to the sixth.
b) Analyzing only harmonic magnitudes for harmonics from the six through the fifteen inclusive.
c) For one or more selected harmonics, the difference between the recent selected harmonic magnitude and the initial selected harmonic magnitude crosses a predetermined warning limit.
d) For one or more selected harmonics, the difference between the next selected harmonic magnitude and the most recent previous selected harmonic magnitude crosses a predetermined warning limit.
e) For one or more selected harmonics, the difference between the next selected harmonic magnitude and the average of two or more recent selected harmonic magnitudes crosses a predetermined warning limit.
f) The rate of magnitude change of one or more selected harmonics crosses a predetermined warning limit.
g) The acceleration of magnitude changes of one or more selected harmonics crosses a predetermined warning limit.

Since the vehicle tires 104 are all mounted on the same vehicle frame 102 each accelerometer (vibration sensor) 108 will be detecting vibration signals from all of the tires 104, thereby contaminating each tire's FFT harmonic spectrum with vibration signal contributions (noise) from other tires 104. As noted in the background, there is also contaminating noise, both periodic and random, that is introduced by many other sources. Therefore the vibration data that is measured by a selected sensor 108 must be cleaned by removing as much as possible of the vibration data values that are not coming from the tire 104 that is closest to the selected sensor 108.

Signal averaging over an appropriate amount of time is a preferred method for cleaning the data measured by a sensor 108. This is accomplished by overlaying sequential revolutions of each tire's data with itself, adding the signals together, then dividing by the total number of overlays. This will reinforce the signals coming from each individual tire 104, but will average out data from other tires 104 and other periodic vibration sources due to their signals moving out of phase over time. Random noise sources (non-periodic) are by definition not in phase with the tire 104 periodic signal, therefore random noise is quickly and easily averaged out of the data stream. The phase of the selected tire's 104 data is preserved by starting each overlay at a trigger point of the tire revolution indicator 106. If no tire revolution indicator 106 is available, cross correlation analysis of the selected sensor's 108 vibration signal can be used to self determine the trigger point for its overlay synchronizing. The movement of relative phase between tires 104 and other vibration sources is caused by each tire 104 having a slightly different rolling radius due to manufacturing tolerances, different air pressures, and from driving around corners and braking/accelerating that causes one tire 104 to compress and slip more than another tire 104. Similarly, the relative phases of other drive train components also move due to cornering and the differential gear causing more of the drive train motion to be input to one track than another.

The data cleaning effectiveness of signal averaging improves with the number of cycles that are averaged together, particularly since small phase differences between the tires 104 take longer to average out, however this is partly mitigated by the relatively smaller magnitudes of signals that are attenuated by traveling longer distances through the vehicle structure 102. However, the number of cycles of signal averaging must be minimized in order to detect rapidly changing vibration magnitudes such as are likely to occur when catastrophic tire failure is immanent. Therefore, further signal cleaning is desirable.

After signal averaging has been used to clean the vibration signal as much as possible, then fast Fourier transform analysis of the averaged vibration signal (time domain) is used to create a harmonic spectrum for the selected tire 104. In the frequency domain, averaging of subsequent FFT spectra will produce further noise cancellation but is still limited by the desire to detect rapidly changing harmonic magnitudes. Coherence function calculations can be used to further clean noise from the spectral data. This well-known mathematical technique calculates correlation of each frequency data value with the frequency data values being measured by the other three vibration sensors 108, thereby determining coherence values for the spectrum of the selected tire 104 relative to that of each other tire 104. Frequency data that has a high coherence with a different tire 104 is subtracted out, thereby further cleaning the measurement data.

Time domain analysis of vibration in conjunction with a rotational angle detector (tire revolution indicator) 106 output (especially output from an encoder) is used to determine a defect's rotational angle, i.e., the location of the defect on the tire 104. Even if the tire revolution indicator 106 is merely a pulse at zero degrees, the defect's rotational angle can be approximately determined by interpolating between pulses (e.g., using time elapsed between pulses multiplied by the most recent angular velocity calculated from time between pulses).

The term "time" as used in this description should be understood to mainly refer to time elapsed while the tire 104 is in operation. The tire revolution indicator 106, if present, is ideal for determining velocity, thereby indicating operation of the tire 104. If not present, then the first harmonic of vibration can be used to determine a tire's angular velocity.

With reference to FIGS. 2 and 3, a second embodiment of the invention will now be described wherein the inventive methods are extended to apply to a tire testing system 200 wherein a plurality of tires 104 are on a plurality of concurrently operating tire testing machines 210 (e.g., four machines 210a, 210b, 210c, 210d), all of which are installed on a common support structure 216 (e.g., the floor of a testing laboratory).

Each tire testing machine 210 includes a tire mounting wheel 240 that is removably attached (e.g., by lug nuts) to a hub, axle and bearing 206 by means of which the tire 104 is rotatably mounted on the machine body 230. A tire rotational angle detector (encoder) is incorporated with each hub, axle and bearing 206 and is therefore given the same reference number 206. A vibration sensor 208 (preferably an accelerometer) is mounted as close as possible to each of the operating test tires 104, preferably mounted on a non-rotating part of the hub, axle and bearing 206 as close as possible to the tire 104.

A large diameter load wheel (road wheel) 212 (shown here optionally mounted beneath the floor 216) has a circumferential simulated road surface 214 that is pressed against the tire 104 with a predetermined loading force. Either the load wheel 212 or the axle 206 is rotationally driven by a speed controlled motor (not shown), thereby operating (running) the test tire 104 in a predetermined and feedback controlled test procedure such as, for example, a tire life test described hereinabove.

Each test machine's vibration sensor 108 and revolution indicator 106 is connected through signal wires 121 to a computer station 224, which in turn has suitable output(s) to an attached monitor/display. Each computer station 224 is a microprocessor with sufficient data storage memory and appropriate input/output interfaces (I/O) as needed to perform all the functions described herein for the inventive tire testing group system 200, i.e., substantially the same functions that are performed by the computer 110 as described herein for the inventive vehicular system 100. All of the computer stations 224 are networked together (e.g., by communication cables 220) so that measurement data can be shared to enable coherence function calculations that can subtract from a selected tire's 104 harmonic spectrum the frequency domain noise contributions from all the other machines 210 and tires 104 on those other machines 210. The network 220 communication is not needed, of course, for using signal averaging to clean vibration signals. A central computer 250 is shown connected to the network 220. This computer can coordinate test operations on the plurality of test machines 210, and/or can provide centralized reporting of test operations and results. Alternatively, the central computer 250 can function analogously to the single vehicle computer 110 to perform all the inventive method steps for all of the concurrently operating test tires 104 in the inventive tire testing group system 200. Even further, the central computer 250 could also replace all of the functionality of the plurality of machine computer stations 224, thereby eliminating them from the system.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method for determining immanence of catastrophic failure for a selected tire among a plurality of tires that are concurrently in operation, the method comprising the steps of:
   selecting a tire from the plurality of tires;
   monitoring vibration amplitude versus time signals for the selected tire;
   using signal averaging to minimize signal noise in the selected tire's vibration signals;
   at selected intervals, fast Fourier transforming the averaged vibration signals to create a harmonic spectrum for the selected tire;
   cleaning the selected tire's harmonic spectrum by applying coherence function and averaging calculations to it for minimizing contributions to the selected tire's harmonic spectrum from all other vibration sources including the remaining one(s) of the plurality of tires;
   comparing the most recent cleaned spectrum with stored values of previous cleaned spectra of the selected tire to track changes in higher order harmonic magnitudes;
   determining whether catastrophic failure of the selected tire is immanent by analyzing the changes in higher order harmonic magnitudes and comparing them with predetermined failure critera; and
   issuing a warning when the method determines that catastrophic failure is immanent for the selected tire, thereby enabling appropriate actions in response by an operator or machine controller.

2. The method of claim 1, wherein the term "higher order harmonic" refers to the sixth and higher harmonics.

3. The method of claim 1, wherein the term "higher order harmonic" refers to the harmonics six through fifteen inclusive.

4. The method of claim 1, further comprising the steps of:
   determining and storing initial cleaned harmonic magnitudes for selected ones of the higher order harmonics; and
   defining one of the predetermined failure criteria such that:
   for one or more of the selected harmonics, the difference between the recent selected harmonic cleaned magnitude and the initial selected harmonic cleaned magnitude crosses a predetermined warning limit.

5. The method of claim 1, further comprising the steps of:
   determining and storing the most recent cleaned harmonic magnitudes for selected ones of the higher order harmonics;
   determining the next cleaned harmonic magnitudes for selected ones of the higher order harmonics; and
   defining one of the predetermined failure criteria such that:
   for one or more of the selected harmonics, the difference between the next selected harmonic cleaned magnitude and the most recent previous selected harmonic cleaned magnitude crosses a predetermined warning limit.

6. The method of claim 1, further comprising the steps of:
   determining and storing an average of two or more recent cleaned harmonic magnitudes for selected ones of the higher order harmonics;
   determining the next cleaned harmonic magnitudes for selected ones of the higher order harmonics; and
   defining one of the predetermined failure criteria such that:
   for one or more of the selected harmonics, the difference between the next selected harmonic cleaned magnitude and the average of two or more recent selected harmonic cleaned magnitudes crosses a predetermined warning limit.

7. The method of claim 1, further comprising the steps of:
   storing values and then comparing the stored values of a series of recent cleaned spectra to determine rates of magnitude change for selected ones of the higher order harmonics; and
   defining one of the predetermined failure criteria such that:

the rate of magnitude change of one or more of the selected harmonics crosses a predetermined warning limit.

8. The method of claim 1, further comprising the steps of:

storing values and then comparing the stored values of a series of recent cleaned spectra to determine rates of magnitude change for selected ones of the higher order harmonics;

storing a series of the rates of magnitude change and then comparing the stored values of the rates to determine acceleration of magnitude changes for selected ones of the higher order harmonics; and defining one of the predetermined failure criteria such that:

the acceleration of magnitude changes of one or more of the selected harmonics crosses a predetermined warning limit.

9. The method of claim 1, wherein the plurality of tires are on a vehicle; and the method further comprises the step of:

warning a vehicle operator to slow and/or stop the vehicle operation when the method determines that catastrophic failure is immanent for the tire on the one machine.

10. The method of claim 9, further comprising the step of:

indicating which one of the plurality of tires is subject to immanent failure.

11. The method of claim 9, wherein the other vibration sources include periodic vibration generators of a nearby vehicle.

12. The method of claim 1, wherein the plurality of tires are on a plurality of concurrently operating tire testing machines; and the method further comprises the step of:

automatically shutting down a one machine of the plurality of tire testing machines when the method determines that catastrophic failure is immanent for the tire on the one machine.

13. The method of claim 12, wherein the other vibration sources include periodic vibration generators of a nearby tire testing machine.

14. The method of claim 1, wherein the other vibration sources include periodic vibration generators in a drive train that rotates the selected tire.

15. The method of claim 1, further comprising the step of:

using a tire revolution indicator at each one of the plurality of tires for synchronizing a tire's vibration signal with the tire's rotational angle.

16. A vehicle tire failure prediction and warning system for a vehicle having a plurality of tires, the system comprising:

a vibration sensor mounted close to each one of the plurality of tires;

a computer connected for collecting and storing vibration amplitude versus time signals for each one of the plurality of tires, and capable of calculating fast Fourier transform spectra, and of comparing vibration amplitudes and harmonic magnitudes over time such that indicative changes in vibration amplitudes, harmonic magnitudes, and/or rates of change of harmonic magnitudes can be determined; and a display system in the vehicle for warning a vehicle operator about values of the indicative changes determined by the computer that are predetermined to be predictive of immanent catastrophic tire failure.

17. The system of claim 16, further comprising:

a tire revolution indicator at each one of the plurality of tires, each tire revolution indicator being connected for sending rotational angle data to the computer.

18. The system of claim 16, further comprising:

an alarm for warning the vehicle operator to slow and/or stop the vehicle operation when the system predicts immanent failure of a one of the plurality of tires; and a display for indicating the one tire that is about to fail.

* * * * *